United States Patent Office.

GEORGE P. BARNUM, OF MARION, IOWA.

Letters Patent No. 67,627, dated August 13, 1867

IMPROVED OINTMENT FOR HORSES.

The Schedule referred to in these Letters Patent and making part of the same.

TO ALL WHOM IT MAY CONCERN:

Be it known that I, GEORGE P. BARNUM, of Marion, in the county of Linn, and State of Iowa, have invented a certain new and useful Improvement in Ointment for use on Horses and other animals; and I do hereby declare that the following is a full, clear, and exact description thereof.

To enable others skilled in the art to make and use my invention, I will proceed to describe it.

My invention consists in making a new and improved ointment for use on horses and other animals, and especially useful to cure the ringbone, spavin, curb, and splint.

In preparing my compound I take eight ounces of quicksilver, four ounces of nitric acid, four drachms of pulverized cantharides, half an ounce of corrosive sublimate, and half an ounce of red precipitate, and put them into a stone or earthen vessel, and then add four ounces of the oil of vitriol in small quantities, and stir the mixture till it is cool. I then put it into glass bottles having wide glass stoppers, and let it stand twelve hours.

In applying my ointment I first shave off the hair from about two-thirds of the surface of the blemish, and then apply the paste to the surface thus exposed once in twelve hours. From three to four applications of my ointment, made in this manner, will effect a cure. The advantages of this treatment are apparent, as ringbone, spavin, curb, or splint may be removed without breaking the skin or injuring the animal in any way.

Having thus described my invention, what I claim is—

The compound, consisting of quicksilver, nitric acid, pulverized cantharides, corrosive sublimate, red precipitate, and oil of vitriol, as an ointment to remove blemishes from horses and other animals, substantially as herein set forth and described.

G. P. BARNUM.

Witnesses:
N. M. HUBBARD,
C. M. HOLLIS.